US009080507B2

(12) United States Patent
Gunewardena

(10) Patent No.: US 9,080,507 B2
(45) Date of Patent: Jul. 14, 2015

(54) MULTI-DISPLACEMENT INTERNAL COMBUSTION ENGINE THAT REMOVABLY COUPLES A PLURALITY OF ENGINE MODULES, AXIALLY AT THEIR CRANKSHAFTS, TO A SINGLE COMMON OUTPUT

(71) Applicant: Anthony Rohan Gunewardena, Fontana, CA (US)

(72) Inventor: Anthony Rohan Gunewardena, Fontana, CA (US)

(*) Notice: Subject to any disclaimer, the term of this patent is extended or adjusted under 35 U.S.C. 154(b) by 61 days.

(21) Appl. No.: 13/663,322

(22) Filed: Oct. 29, 2012

(65) Prior Publication Data

US 2013/0110375 A1     May 2, 2013

Related U.S. Application Data

(60) Provisional application No. 61/552,412, filed on Oct. 27, 2011.

(51) Int. Cl.
| | |
|---|---|
| *G01M 15/04* | (2006.01) |
| *F02B 73/00* | (2006.01) |
| *F02D 25/04* | (2006.01) |
| *B60K 5/08* | (2006.01) |

(52) U.S. Cl.
CPC ............... *F02B 73/00* (2013.01); *F02D 25/04* (2013.01); *B60K 5/08* (2013.01)

(58) Field of Classification Search
CPC ............ F02B 73/00; F02D 25/04; B60K 5/08

USPC ................. 73/114.13, 114.14, 114.15, 115.01
See application file for complete search history.

(56) References Cited

U.S. PATENT DOCUMENTS

| | | | | |
|---|---|---|---|---|
| 2009/0133662 A1* | 5/2009 | Hartmann et al. | ..... | 123/198 DC |
| 2010/0180857 A1* | 7/2010 | Yokoyama et al. | ........ | 123/198 F |
| 2011/0246030 A1* | 10/2011 | Jueptner | .................... | 701/50 |

FOREIGN PATENT DOCUMENTS

| | | |
|---|---|---|
| EP | 1341999 B1 | 12/2008 |
| WO | 9006424 A1 | 6/1990 |

OTHER PUBLICATIONS

International search report and written opinion dated Jan. 30, 2013 issued in corresponding PCT application PCT/US2012/062487.

\* cited by examiner

*Primary Examiner* — Eric S McCall

(74) *Attorney, Agent, or Firm* — DLA Piper LLP (US)

(57) ABSTRACT

The present system provides a power plant comprising plurality of distinct small displacement engines that are removably coupled to a crankshaft using a clutch system. This allows the power plant to operate both as a small displacement engine, with its inherent fuel efficiency advantages, as well as a large displacement engine, with its advantages in power and torque. The system uses a management system to determine when to activate or deactivate engine modules for maximum efficiency. Because the system does not rely on prior art valve deactivation, the system does not suffer from the frictional losses of the prior art, and greater fuel efficiency is achieved.

5 Claims, 2 Drawing Sheets

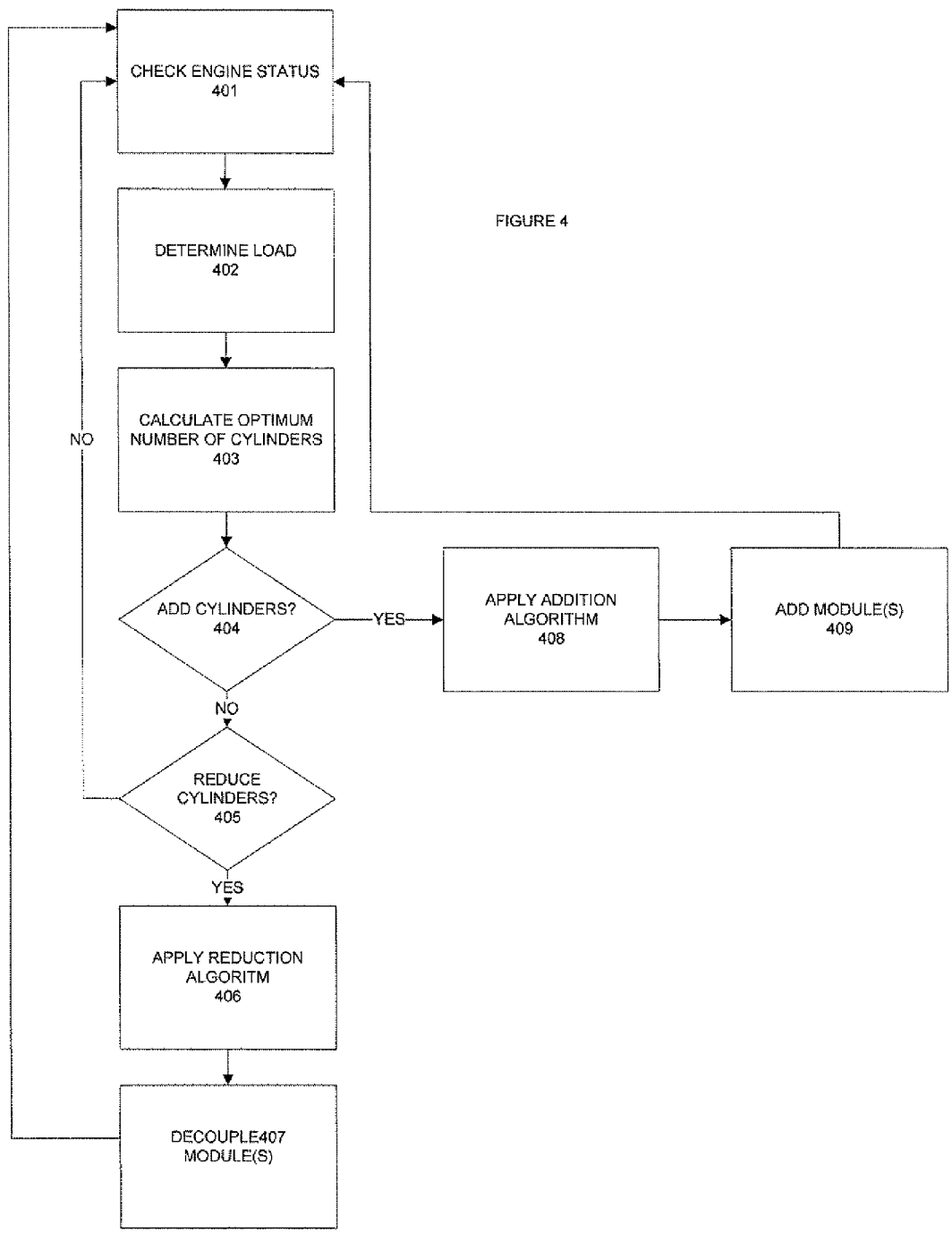

MULTI-DISPLACEMENT INTERNAL COMBUSTION ENGINE THAT REMOVABLY COUPLES A PLURALITY OF ENGINE MODULES, AXIALLY AT THEIR CRANKSHAFTS, TO A SINGLE COMMON OUTPUT

This patent application claims priority to U.S. Provisional Patent Application Ser. No. 61/552,412 filed on Oct. 27, 2011, incorporated by reference herein in its entirety.

BACKGROUND

There are a number of trade-offs in selecting a power source for a vehicle, particularly one that uses an internal combustion engine. Typically, a large displacement multi-cylinder engine (e.g. V-8, V-10, V-12) is employed where applications of high horsepower and/or torque are required or desired. Such engines can provide high power and torque quickly and are useful for rapid acceleration and towing power, among other things. A disadvantage of large-displacement engines is the lack of fuel economy. Such engines typically get lower mileage than small displacement engines (e.g. 2, 4, or 6 cylinder engines). A small displacement engine can provide greater fuel economy, but lacks high power and torque. Consequently, small displacement engines do not allow rapid acceleration, towing capacity, and the like.

One proposed solution for the trade-offs in selecting engine size has been the use of the so-called "variable-displacement" engine. Variable displacement internal combustion engines are known in the art to improve fuel economy by selectively shutting off fuel supply to several cylinders of the engine when reduced power output can operate the vehicle adequately. However, the current techniques used to implement variable-displacement engines create additional disadvantages.

One disadvantage is the technique of valve deactivation used in implementing a variable displacement engine. This reduces the number of active cylinders, but the deactivated cylinders still suffer from frictional losses of the deactivated chambers. Thus, a variable displacement engine operating on four cylinders does not have the same fuel efficiency as a stand-alone four cylinder engine. Therefore, the maximum efficiency of the variable displacement engine is not achieved.

SUMMARY

The present system provides a power plant comprising plurality of distinct small displacement engines that are removably coupled to a crankshaft using a clutch system. This allows the power plant to operate both as a small displacement engine, with its inherent fuel efficiency advantages, as well as a large displacement engine, with its advantages in power and torque. The system uses a management system to determine when to activate or deactivate engine modules for maximum efficiency. Because the system does not rely on prior art valve deactivation, the system does not suffer from the frictional losses of the prior art, and greater fuel efficiency is achieved.

BRIEF DESCRIPTION OF THE DRAWINGS

FIG. 4 is a flow diagram illustrating the operation of an embodiment of the system.

DETAILED DESCRIPTION OF THE SYSTEM

The system provides a multi-displacement internal combustion engine comprising a plurality of engine modules that are removably coupled to a crank shaft and controlled by a management system. In one embodiment, each module is coupled to a drive shaft through a magnetic clutch assembly.

Figure 1:
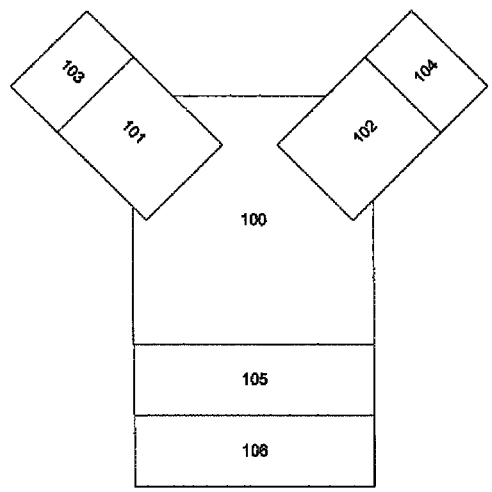
FIG. 1 is an example of an engine module in an embodiment of the system.

FIG. 1 illustrates an example of an engine module in one embodiment of the system. The engine module comprises a two cylinder engine with the cylinders in a V configuration. It should be noted that the modules can have other configurations without departing from the scope and spirit of the system. The module is shown functionally in FIG. 1, but the module can be of a type such as described in U.S. Pat. No. 6,655,337 entitled V-Type 2-Cylinder Engine which is incorporated by reference herein in its entirety. However, the system is not limited to V-2 engines but may also be single cylinder internal combustion engine. In fact, the present system can operate where the motor modules have any number of cylinders. The motor modules may also be rotary type engines without departing from the scope and spirit of the system. In a rotary embodiment, each motor module may have at least one rotor.

Referring to FIG. 1, the module comprises an engine block 100 that includes two cylinders 101 and 102 arranged in a V configuration. Each cylinder includes a cam assembly 103 and 104 respectively. The module includes a crankshaft assembly 105 and drive shaft transfer assembly 106.

Figure 2:
FIG. 2 is an example of a multi-displacement configuration of engine modules in an embodiment of the system.

FIG. 2 is an example of one embodiment of the system showing a plurality of modules coupled via clutch mechanisms to a drive shaft. The example shown in FIG. 2 includes 4 motor modules M1-M4. Module M1 is permanently coupled to the drive shaft and to the transmission. This is because the system contemplates that at least one module will always be active and so there is no need to removably couple this always active module from the motive system of the vehicle. Each motor module may be of the type of FIG. 1 and described in U.S. Pat. No. 6,655,337. This is by way of example as other configurations may be used without departing from the scope and spirit of the system.

The remaining modules are each coupled to the drive shaft via a clutch system. As shown, module M2 is removably coupled to the system via clutch assembly C2. Modules M3 and M4 are removable coupled via clutch assemblies C3 and C4 respectively. It is anticipated that the modules will come on and off line in order from M2 to M4, but the system can be operated with any combination of modules M2 to M4 operating in conjunction with module M1.

When a module is deactivated, the clutch assembly removes the module from the drive shaft and the module is shut down. This means that the module no longer receives spark for the cylinders, and, due to the separation from the drive shaft, the camshafts no longer rotate, eliminating frictional energy that the remaining modules must overcome.

In one embodiment, the clutch assemblies are magnetic clutch assemblies. In other embodiments, the clutch assemblies may be fluid clutch assemblies. Any suitable clutch assembly may be used without departing from the scope and spirit of the system.

Although the modules are shown as separate in FIG. 2, the system also contemplates a plurality of modules that share a common block.

Figure 3:
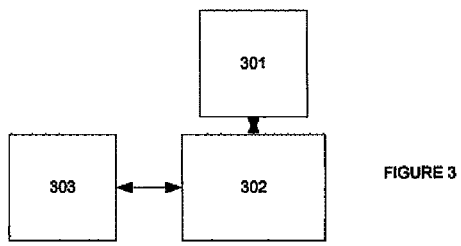
FIG. 3 is a block diagram of a control system of an embodiment of the system.

FIG. 3 is an example of a control system of an embodiment of the system. The control system includes a sensor input module 301 to receive information from the vehicle that is used to make decisions on how many modules will be enabled. The controls system also includes an engine management module 302 that receives the sensor input and determines engine use and power requirements. The management module is coupled to a module controller 303 that is coupled to modules M2-M4 of the system. Based on the commands received from engine management module 302, one or more of modules M2-M4 are enabled and/or disabled as needed.

FIG. 4 is a flow diagram illustrating the control process of one embodiment of the system. At step 401 the system checks the engine status. At step 402 the system determines the current engine load. At step 403 the system determines the optimum number of cylinders to be associated with the current engine load.

At decision block 404 it is determined whether there is a need to add cylinders to reach the optimum cylinder number. If not, the system next checks to see if the system must reduce the number of cylinders to reach the optimum cylinder number. If not, that means that the current number of cylinders is optimum and the system returns to step 401.

If the system determines that the number of cylinders is to be reduced at decision block 405, then the system proceeds to step 406 and applies the cylinder reduction algorithm. In one embodiment the system defines different ranges of operation for cylinder reduction versus cylinder addition. The system also may implement different rules for how many cynlinders can be changed in a single operation. For example, the system may allow the system to drop from 8 cylinders to 4 without an intermediate step, but may require that the system ramp up from 4 cylinders to 6 cylinders and then to 8 cylinders in a condition when the optimum is 8 but the current status is 4. In other embodiments, it may be that greater jumps are permitted when increasing versus decreasing. In other embodiments, the system may have the same restrictions in both directions.

After applying the reduction algorithm at step 406 the system proceeds to step 407 and decouples the appropriate number of motor modules. As note previously, the system may have a certain requirement for which modules are active for a particular 4, or 6 cylinder configuration. If so, the system decoupled the appropriate motor module or modules to satisfy this requirement. The system then returns to step 401.

If the system is to add cylinders at decision block 404, the system proceeds to step 408 and applies the cylinder addition algorithm. The system may define different load ranges when adding cylinders to maximize efficiency and to optimize the comfort of the ride and passengers. At step 409 the system adds the appropriate number of motor modules and returns to step 401 to continue monitoring the engine.

Depending on how many modules are enabled, the firing order of the cylinders can be modified to provide the smoothest and most efficient usage of the available modules. In one embodiment, each module is itself balanced, to ease in the management of the system. In addition, the modules can be brought online and offline in any order.

In another embodiment, one or more of the modules can be replaced with electric motors instead of internal combustion motors to provide hybrid operation of the system. In another embodiment, electric motors are added to the system of FIG. 3 to provide more options for providing power.

There are a plurality of control systems in the prior art for controlling variable displacement engines and such control systems may be used with the present system.

Thus, a method and apparatus for providing content from a plurality of sources is described.

What is claimed is:

1. An engine system comprising:
   a first engine module permanently coupled to a drive shaft of a vehicle through a transmission;
   a plurality of subsequent engine modules removably and axially coupled to the first engine module, via a plurality of clutch assemblies; and
   a control system that receives information from the vehicle and that couples or decouples one or more of the subsequent engine modules to or from the first engine module based on the information received from the vehicle.

2. The engine system of claim 1, wherein each of the first and subsequent engine modules comprises at least one cylinder with a crankshaft assembly aligned axially with crankshaft assemblies of the other engine modules.

3. The engine system of claim 1, wherein the clutch assemblies are magnetic clutch assemblies.

4. The engine system of claim 1, wherein the clutch assemblies are fluid clutch assemblies.

5. The engine system of claim 1, wherein the control system comprises:
   a sensor input module that receives the information from the vehicle;
   an engine management module that determines an optimum number of cylinders for a current load on the engine system; and
   a module controller coupled to the subsequent engine modules that couples or decouples one or more of the subsequent engine modules to or from the first engine module based on commands received from the engine management module.

* * * * *